United States Patent
Cao

(10) Patent No.: US 11,269,654 B2
(45) Date of Patent: Mar. 8, 2022

(54) METHOD FOR BOOTING STARTUP OF ELECTRONIC DEVICE, ELECTRONIC DEVICE, AND READABLE STORAGE MEDIUM

(71) Applicant: BOE Technology Group Co., Ltd., Beijing (CN)

(72) Inventor: Dongbo Cao, Beijing (CN)

(73) Assignee: BOE TECHNOLOGY GROUP CO., LTD., Beijing (CN)

( * ) Notice: Subject to any disclaimer, the term of this patent is extended or adjusted under 35 U.S.C. 154(b) by 290 days.

(21) Appl. No.: 16/516,962

(22) Filed: Jul. 19, 2019

(65) Prior Publication Data

US 2020/0159542 A1   May 21, 2020

(30) Foreign Application Priority Data

Oct. 17, 2018  (CN) .......................... 201811207198.5

(51) Int. Cl.
G06F 9/4401      (2018.01)
G06F 9/48        (2006.01)

(52) U.S. Cl.
CPC .......... *G06F 9/4406* (2013.01); *G06F 9/4825* (2013.01)

(58) Field of Classification Search
CPC ..... G06F 9/4406; G06F 9/4825; G06F 9/4401
USPC .......................................................... 713/2
See application file for complete search history.

(56) References Cited

U.S. PATENT DOCUMENTS

| | | | | |
|---|---|---|---|---|
| 5,905,888 A | * | 5/1999 | Jones | G06F 3/0632 713/2 |
| 6,477,642 B1 | * | 11/2002 | Lupo | G06F 9/4401 713/1 |
| 6,873,333 B1 | * | 3/2005 | Patel | G06T 1/00 345/156 |
| 8,189,014 B1 | * | 5/2012 | Tam | G09G 5/377 345/629 |
| 8,560,822 B1 | * | 10/2013 | Chan | H04N 21/443 713/1 |

(Continued)

FOREIGN PATENT DOCUMENTS

| | | |
|---|---|---|
| CN | 101526905 A | 9/2009 |
| CN | 101923479 A | 12/2010 |

(Continued)

OTHER PUBLICATIONS

First Office Action, including Search Report, for Chinese Patent Application No. 201811207198.5, dated Apr. 1, 2021, 31 pages.

(Continued)

*Primary Examiner* — Paul R. Myers
(74) *Attorney, Agent, or Firm* — Westman, Champlin & Koehler, P.A.

(57) ABSTRACT

The present disclosure relates to a method for booting startup of an electronic device, an electronic device, and a readable storage medium. The electronic device includes a boot program Boot, an operating system, a preset boot memory, and a display screen, wherein the preset boot memory is configured to store image information. The method for booting startup of an electronic device includes: running the boot program Boot to start up the operating system, and during the startup of the operating system by the boot program Boot, refreshing, by the boot program Boot, the image information stored in the preset boot memory to a controller of the display screen.

16 Claims, 3 Drawing Sheets

(56) References Cited

U.S. PATENT DOCUMENTS

| | | | |
|---|---|---|---|
| 8,869,282 B1* | 10/2014 | Lazarowitz | G06F 21/562 726/24 |
| 8,982,158 B2* | 3/2015 | Chen | G06F 3/1415 345/649 |
| 2002/0073305 A1* | 6/2002 | Joseph | G06F 9/4401 713/1 |
| 2003/0122864 A1* | 7/2003 | Jenne | G06F 3/14 715/738 |
| 2006/0200672 A1* | 9/2006 | Calhoon | G06F 21/16 713/176 |
| 2007/0118728 A1* | 5/2007 | Zhao | H04L 67/34 713/1 |
| 2009/0019384 A1* | 1/2009 | Chien | G06F 9/4401 715/764 |
| 2010/0325409 A1* | 12/2010 | Kim | G06F 9/4401 713/2 |
| 2011/0197055 A1* | 8/2011 | Spottswood | G06F 9/4401 713/2 |
| 2012/0086857 A1* | 4/2012 | Kim | H04N 21/4432 348/563 |
| 2012/0117368 A1 | 5/2012 | Itoh | |
| 2012/0254602 A1* | 10/2012 | Bhansali | G06F 9/4406 713/2 |
| 2013/0145393 A1* | 6/2013 | Gold-Gavriely | G06Q 30/0251 725/32 |
| 2014/0181497 A1* | 6/2014 | Dominicus | G06F 9/4406 713/2 |
| 2016/0062772 A1* | 3/2016 | Sakaida | G06F 9/4401 713/2 |
| 2018/0285121 A1* | 10/2018 | Lambert | G06F 9/4405 |
| 2019/0087200 A1* | 3/2019 | Bellanger | G06F 3/14 |

FOREIGN PATENT DOCUMENTS

| | | |
|---|---|---|
| CN | 103049257 A | 4/2013 |
| CN | 106598619 A | 4/2017 |
| CN | 108228130 A | 6/2018 |
| CN | 108255524 A | 7/2018 |
| TW | 201833723 A | 9/2018 |

OTHER PUBLICATIONS

"Linux operating system implementation principle", dated Sep. 30, 2018, 19 pages.

\* cited by examiner

The boot program Boot is run to start up the operating system, and during the startup of the operating system by the boot program Boot, the boot program Boot refreshes the image information stored in the preset boot memory to the display screen
Fig. 1
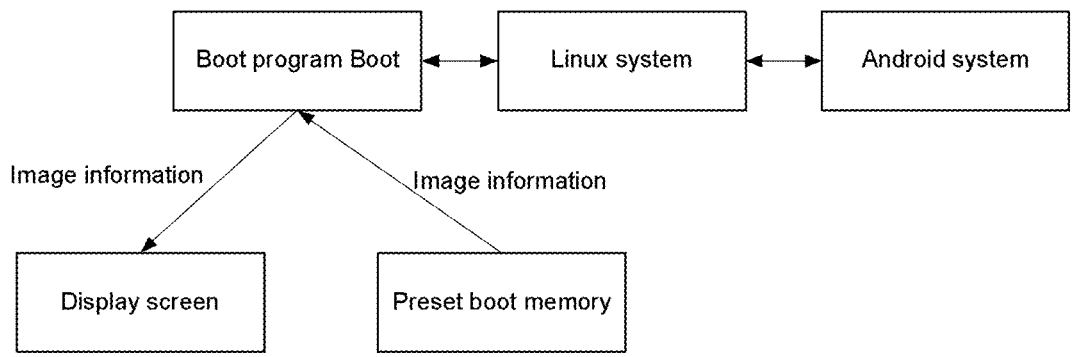
Fig. 2
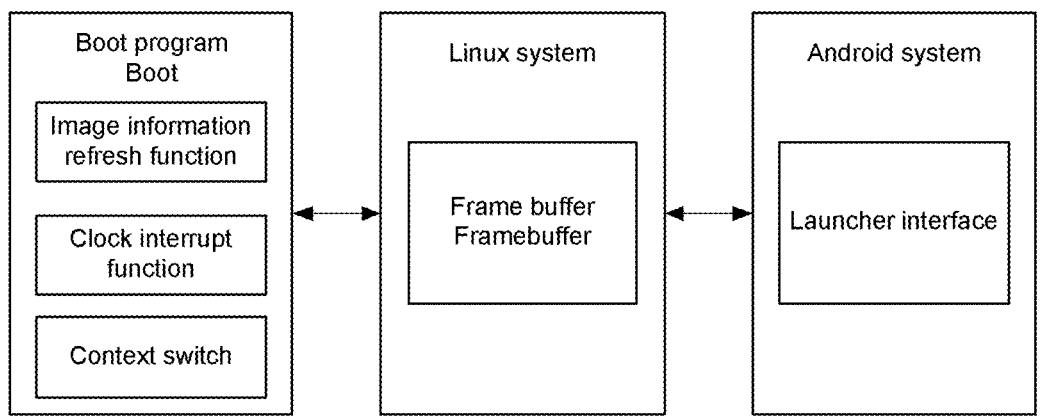
Fig. 3

METHOD FOR BOOTING STARTUP OF ELECTRONIC DEVICE, ELECTRONIC DEVICE, AND READABLE STORAGE MEDIUM

CROSS-REFERENCE TO RELATED APPLICATION(S)

This application claims priority to the Chinese Patent Application No. 201811207198.5, filed on Oct. 17, 2018, entitled "METHOD FOR BOOTING STARTUP OF ELECTRONIC DEVICE, ELECTRONIC DEVICE, AND READABLE STORAGE MEDIUM", which is incorporated herein by reference in its entirety.

TECHNICAL FIELD

The present disclosure relates to the field of control technologies, and more particularly, to a method for booting startup of an electronic device, an electronic device, and a readable storage medium.

BACKGROUND

Currently, electronic devices are mostly installed with an operating system such as an Android system. When an electronic device is started up, it takes a long time to start up the Android system. A user may not use the electronic device normally until the Android system is started up successfully, which results in poor user experience due to the long startup time.

SUMMARY

According to a first aspect of the embodiments of the present disclosure, there is provided a method for booting startup of an electronic device, the electronic device comprising a boot program Boot, an operating system, a preset boot memory, and a display screen, wherein the preset boot memory is configured to store image information, the method comprising:

running the boot program Boot to start up the operating system, and during the startup of the operating system by the boot program Boot, refreshing, by the boot program Boot, the image information stored in the preset boot memory to a controller of the display screen.

Alternatively, the image information stored in the preset boot memory comprises at least one of:

image information which is pre-stored by a user in the preset boot memory and image information transmitted from the operating system to the preset boot memory in a previous display process.

Alternatively, the boot program Boot comprises an image information refresh function, and refreshing, by the boot program Boot, the image information stored in the preset boot memory to a controller of the display screen comprises:

reading, by the image information refresh function, the image information from the preset boot memory according to a set period and refreshing the image information to the controller of the display screen.

Alternatively, the boot program Boot comprises a clock interrupt function, and the method further comprises:

switching, by the boot program Boot, a context for the refreshing of the image information and a context of the operating system according to an interrupt signal output by the clock interrupt function to switch between an operation of refreshing the image information and an operation of starting up the operating system.

Alternatively, the method further comprises:

refraining the operating system from transmitting any image information to the preset boot memory during the startup.

Alternatively, the method further comprises:

after the startup of the operating system is completed, displaying the image information on the display screen by the operating system transmitting the image information to the preset boot memory.

Alternatively, the method further comprises:

after the startup of the operating system is completed, refreshing, by the boot program Boot and to the controller of the display screen, the image information in the preset boot memory which is transmitted from the operating system.

Alternatively, the image information stored in the preset boot memory is raw image data which has not been encoded.

Alternatively, the operating system is an Android system based on a Linux system.

Alternatively, the preset boot memory is not managed by a partner system in the Linux system.

According to a second aspect of the embodiments of the present disclosure, there is provided an electronic device, comprising a boot program Boot, an operating system, a processor, a memory, a preset boot memory, and a display screen, wherein the preset boot memory is configured to store image information, the display screen is configured to display at least the image information, the memory is configured to store the boot program Boot, and the processor is configured to read the boot program Boot from the memory, and run the boot program Boot to start up the operating system, and the boot program Boot is configured to, during the startup of the operating system, refresh the image information stored in the preset boot memory to a controller of the display screen.

Alternatively, after the startup of the operating system is completed, the operating system is configured to directly refresh the image information to the controller of the display screen.

Alternatively, the boot program Boot comprises an image information refresh function, which is configured to read the image information from the preset boot memory according to a set period and refresh the image information to the controller of the display screen.

Alternatively, the boot program Boot comprises a clock interrupt function, and the boot program Boot is configured to switch a context for the refreshing of the image information and a context of the operating system according to an interrupt signal output by the clock interrupt function to switch between an operation of refreshing the image information and an operation of starting up the operating system.

Alternatively, the operating system is refrained from transmitting any image information to the preset boot memory during the startup.

Alternatively, after the startup of the operating system is completed, the image information is displayed on the display screen by the operating system transmitting the image information to the preset boot memory.

Alternatively, after the startup of the operating system is completed, the image information in the preset boot memory which is transmitted from the operating system is refreshed by the boot program Boot to the controller of the display screen.

Alternatively, the image information stored in the preset boot memory is raw image data which has not been encoded.

Alternatively, the operating system is an Android system based on a Linux system.

Alternatively, the preset boot memory is not managed by a partner system in the Linux system.

According to a third aspect of the embodiments of the present disclosure, there is provided a readable storage medium having stored thereon computer instructions which, when executed by a processor, implement the steps of the method according to the first aspect.

It should be understood that the above general description and the following detailed description are intended to be illustrative and interpretative, and may not be construed as limiting the present disclosure.

BRIEF DESCRIPTION OF THE DRAWINGS

The accompanying drawings, which are incorporated in the specification and constitute a part of the specification, illustrate the embodiments according to the present disclosure, and are used to explain the principles of the present disclosure together with the specification.

FIG. 1 is a schematic flowchart of a method for booting startup of an electronic device according to an embodiment of the present disclosure;

FIG. 2 is a block diagram of an electronic device according to an embodiment of the present disclosure;

FIG. 3 is a schematic diagram illustrating a relationship between a boot program Boot, a Linux system, and an Android system in an electronic device according to an embodiment of the present disclosure;

DETAILED DESCRIPTION

Figure 4:
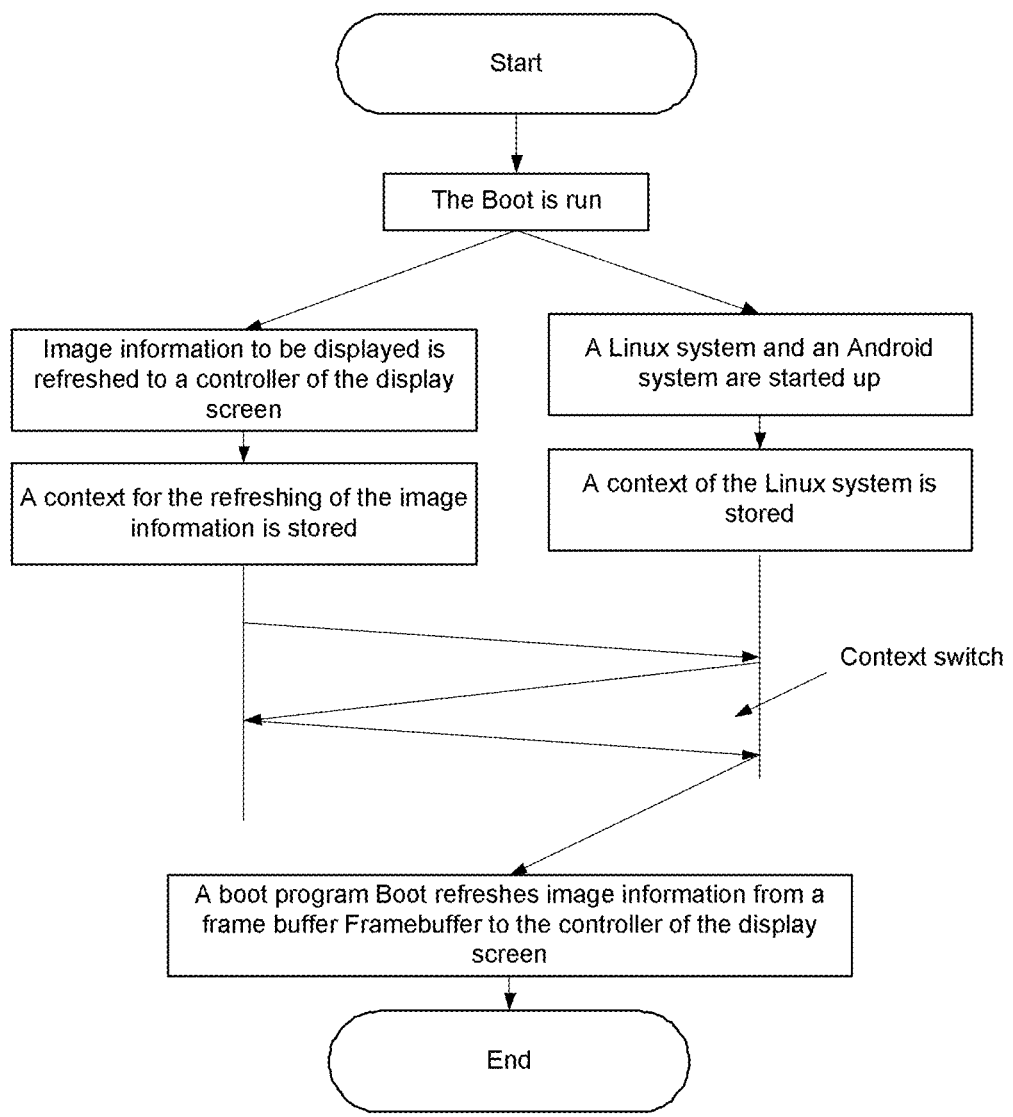
FIG. 4 is a schematic flowchart of another method for booting startup of an electronic device according to an embodiment of the present disclosure.

Exemplary embodiments will be described in detail here, and examples of the embodiments are illustrated in the accompanying drawings. When the following description is related to the accompanying drawings, the same or similar reference signs in different accompanying drawing represent the same or similar elements. Implementations described in the following exemplary embodiments do not represent all implementations according to the present disclosure. Instead, they are merely examples of apparatuses and methods according to some aspects of the present disclosure as described in detail in the appended claims.

Currently, most electronic devices are installed with an operating system such as an Android system. When the electronic device is started up, it takes a long time to start up the Android system. A user may not use the electronic device normally until the Android system is started up successfully, which results in poor user experience due to the long startup time.

To this end, the embodiments of the present disclosure provide a method for booting startup of an electronic device. FIG. 1 is a schematic flowchart of a method for booting startup of an electronic device according to an embodiment of the present disclosure, and FIG. 2 is a block diagram of an electronic device according to an embodiment of the present disclosure. As shown in FIG. 2, the electronic device comprises a boot program Boot, an operating system, a preset boot memory and a display screen, wherein the preset boot memory is configured to store image information. In FIG. 2, an Android system based on a Linux system is taken as an example of the operating system. However, it may be understood by those skilled in the art that the operating system of the electronic device may be any suitable system, for example, systems which have been developed and systems which are to be developed in the future.

As shown in FIG. 1, the method for booting startup of an electronic device comprises the following steps.

The boot program Boot is run to start up the operating system. In the example shown in FIG. 2, the Linux system and the Android system are started up.

During the startup of the Android system and the Linux system by the boot program Boot, the boot program Boot refreshes the image information stored in the preset boot memory to a controller of the display screen.

It should be illustrated that since the Android system is developed based on the Linux system, that is, the Linux system must be started up at the same time as the Android system is started up, the startup of the Android system and the startup of both the Android system and the Linux system are equivalent for a user. The present embodiment will be described by taking an example in which the startup of the operating system is the startup of the Android system and the Linux system.

It should be illustrated that, in the present embodiment, the preset boot memory is a memory area reserved in advance in a physical memory, wherein a size of the memory area may be determined according to the amount of stored image information and a size of each image. Further, in the present embodiment, the preset boot memory is not managed by a partner system in the Linux system, so that the image information stored in the preset boot memory may be prevented from being overwritten, and the accuracy of the image information displayed during the startup of the operating system is ensured.

It may be understood that in the present embodiment, the preset boot memory may store image information pre-stored by the user. Of course, the preset boot memory may also store image information which is displayed in a previous display process and is transmitted from the operating system to the preset boot memory, and a corresponding solution will be described below.

It should also be illustrated that, since there are a few functions in the boot program Boot, in the present embodiment, the image information stored in the preset boot memory may be raw image data which has not been encoded. Of course, when the boot program Boot comprises a decoding function, encoded image information may be stored in the preset boot memory, so that the boot program Boot may decode the image information and then refresh the decoded image information to the controller of the display screen, which may also implement the solution of the present application.

In some embodiments, the boot program Boot comprises an image information refresh function, which may be implemented by modifying a portion of codes in the boot program Boot. The image information refresh function is configured to read the image information from the preset boot memory according to a set period and refresh the image information to the controller of the display screen. It may be seen that, in the present embodiment, the boot program Boot may be processed to achieve the purpose of the boot program Boot processing the image information to be displayed.

In some embodiments, the boot program Boot further comprises a clock interrupt function. In this way, the method for booting startup of an electronic device further comprises: switching, by the boot program Boot, a context for the refreshing of the image information and a context of the operating system according to an interrupt signal output by the clock interrupt function to switch between an operation of refreshing the image information and an operation of starting up the operating system. It may be understood that, in the present embodiment, for the boot program Boot, the refreshing of the image information may be regarded as a task (task 1) which needs to be processed by the boot program Boot, and the startup of the operating system may be regarded as another task (task 2) which needs to be processed by the boot program Boot. In a process of executing the task 1 and the task 2, the boot program Boot may record contexts of the task 1 and the task 2 respectively; and then, the boot program Boot executes the task 1 and the task 2 respectively according to an interrupt signal and the respective contexts. In this way, the boot program Boot may execute the task of refreshing the image information and the task of starting up the operating system at the same time, which ensures that the user may view, for example, the image information which is pre-stored by the user, instead of startup animation of the operating system, during the startup of the operating system.

In practical applications, in the process of the boot program Boot starting up the Android system, a frame buffer Framebuffer in the Linux system may directly write the startup animation of the Android system into the controller of the display screen. To this end, in the present embodiment, the frame buffer Framebuffer is improved, so that the improved frame buffer Framebuffer neither transmits any image information to the preset boot memory nor transmits any image information to the controller of the display screen during the startup of the Android system. Further, after the startup of the Android system is completed, image information is transmitted to the preset boot memory instead of being transmitted to the controller of the display screen, so that the image information is displayed on the display screen. In this way, in the present embodiment, it may be ensured that the image information to be displayed may be uniformly refreshed by the boot program Boot to the controller of the display screen, so that it is convenient for the boot program Boot to abandon the startup animation of the Android system and only the image information is displayed, thereby ensuring only the image information is displayed in the startup process, to ensure the user experience.

In some embodiments, the frame buffer Framebuffer may determine whether a Launcher interface in the Android system has been launched. If the Launcher interface has launched, the frame buffer Framebuffer transmits the image information to the preset boot memory; otherwise, the determination continues to be made. To this end, in the present embodiment, a flag "Flag" may be set to indicate whether the Launcher interface in the Android system has launched. For example, if a value of the Flag is 1, it indicates that the Launcher interface in the Android system has launched, and if the value of the Flag is 0, it indicates that the Launcher interface in the Android system has not launched. In this way, the frame buffer Framebuffer may acquire the value of the Flag and determine whether it is 1. It may be seen that, in the present embodiment, the Launcher interface is used as a triggering condition for driving the frame buffer Framebuffer to transmit the image information, which may ensure that the image information transmitted by the Framebuffer no longer comprises the startup animation of the Android system. Thereby, in the present embodiment, it is ensured that the image information, instead of the startup animation, is displayed in the startup process, thereby ensuring the user experience.

A method for booting startup of an electronic device according to an embodiment of the present disclosure will be further described below with reference to the embodiments and the accompanying drawings.

In the present embodiment, as shown in FIG. 3, an electronic device comprises a boot program Boot, a Linux system, and an Android system. Here, in the present embodiment, improvements are made to the following portions of the electronic device.

Firstly, the boot program Boot, which 1. manages a preset boot memory that communicates therewith;

2. sets an image information refresh function, which reads image information stored in the preset boot memory, displays image information pre-stored by a user, and displays image information transmitted from the Linux system later; and 3. sets a clock interrupt function, which may be implemented by a timer.

Secondly, Framebuffer in the Linux system, which after startup of the Android system is completed, writes the image information into the preset boot memory, instead of directly writing the image information into a controller of a display screen.

As shown in FIG. 4, in the present embodiment, when an electronic device is started up, a boot program Boot is run. The boot program Boot communicates with a preset boot memory, and reads image information to be displayed from the preset boot memory according to a set period through an image information refresh function, and refreshes the image information to a controller of a display screen, that is, task 1. Then, the boot program Boot records a context of the task 1.

Then, the boot program Boot starts up an Android system and a Linux system, that is, task 2, and records a context of the task 2. During the period, a frame buffer Framebuffer in the Linux system acquires a value of a flag "Flag" from the Android system, and determines whether the value of the Flag indicates that a Launcher interface in the Android system has launched. If the value of the Flag indicates that the Launcher interface in the Android system has launched, the frame buffer Framebuffer transmits the image information to the preset boot memory; otherwise, the boot program Boot continues to execute the task 1.

Finally, after the Launcher interface in the Android system has been started up, the frame buffer Framebuffer in the Linux system transmits the image information to the preset boot memory, and the boot program Boot refreshes to the controller of the display screen the image information in the preset boot memory which is transmitted from the frame buffer Framebuffer.

Figure 5:
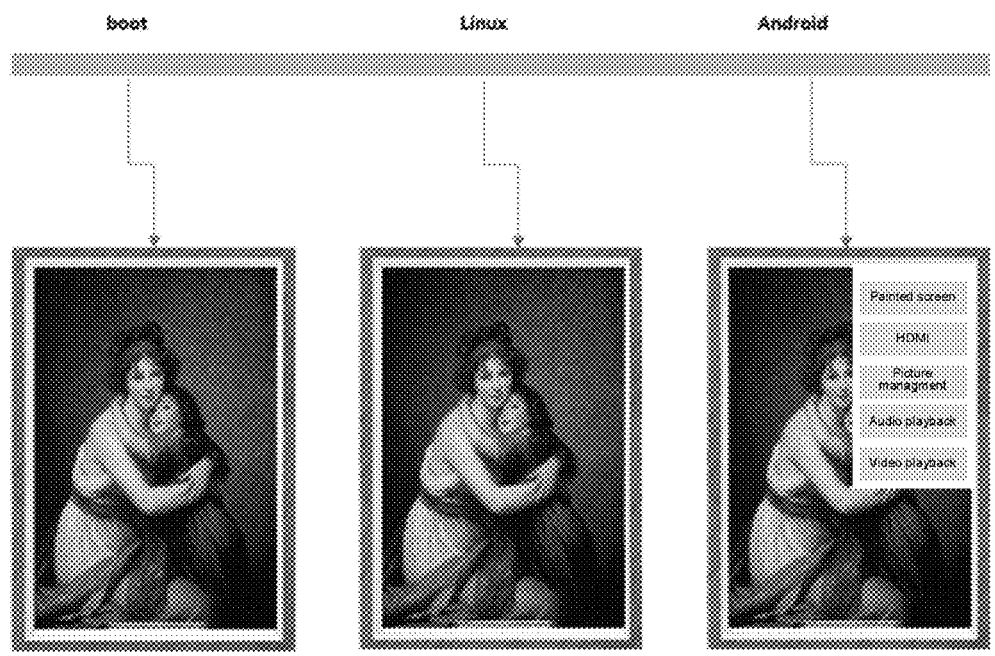
FIG. 5 is a schematic diagram illustrating a display effect of a display screen during startup of an electronic device according to an embodiment of the present disclosure.

After the above process, a display result of the display screen is as shown in FIG. 5, in which the same image information is displayed before and during the startup of the Linux system, and startup animation of the Android system is no longer displayed. After the Launcher interface in the Android system is started up, the Launcher interface may be displayed on the basis of the image information being displayed. For example, the Launcher interface may comprise: a painted screen, a High-Definition Multimedia Interface (HDMI), a picture management function, an audio playback function, and a video playback function, and a user may perform operations through the Launcher interface, to meet his/her own requirements.

Figure 6:
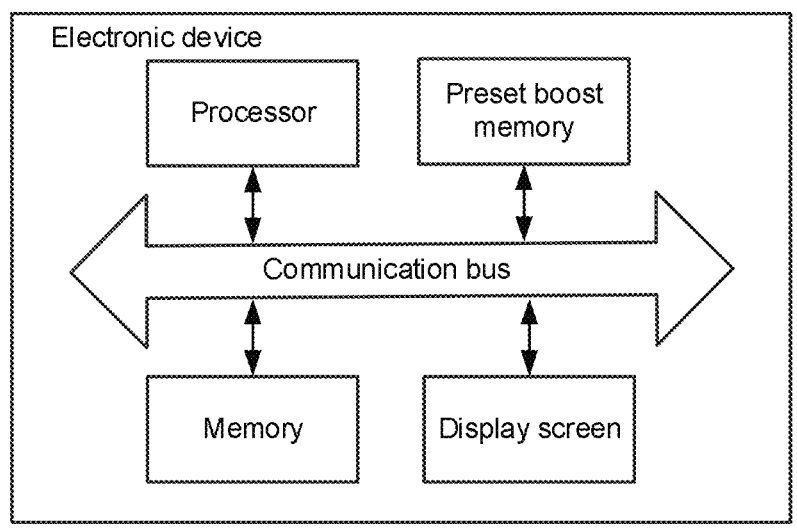
FIG. 6 is a schematic diagram of a hardware structure of an electronic device according to an embodiment of the present disclosure.

The embodiments of the present disclosure further provide an electronic device. FIG. 6 is a schematic diagram of a hardware structure of an electronic device according to an embodiment of the present disclosure. As shown in FIG. 6, the electronic device comprises a processor, a memory, a preset boot memory, and a display screen, wherein the processor, the memory, the preset boot memory, and the display screen communicate with each other through a communication bus respectively. The memory is configured to store a boot program Boot and an operating system (for example, an Android system and a Linux system), the preset boot memory is configured to store image information, the display screen is configured to display at least the image information, and the processor is configured to read the boot program Boot from the memory through the communication bus and run the boot program Boot to:

start up the operating system, and the boot program Boot is configured to, during the startup of the operating system by the boot program Boot, refresh the image information stored in the preset boot memory to a controller of the display screen.

In some embodiments, the image information which is refreshed by the boot program Boot to the controller of the display screen comprises at least one of:

image information which is pre-stored in the preset boot memory by a user, image information which is transmitted from the Linux system to the preset boot memory in a previous display process, and image information which is transmitted to the preset boot memory after the startup of the Launcher interface in the Android system is completed.

In some embodiments, the boot program Boot comprises an image information refresh function, and refreshing, by the boot program Boot, the image information stored in the preset boot memory to the controller of the display screen comprises:

reading, by the image information refresh function, the image information from the preset boot memory according to a set period and refreshing the image information to the controller of the display screen.

In some embodiments, the boot program Boot comprises a clock interrupt function, and the method further comprises:

switching, by the boot program Boot, a context for the refreshing of the image information and a context of the operating system according to an interrupt signal output by the clock interrupt function to switch between an operation of refreshing the image information and an operation of starting up the operating system.

In some embodiments, the method further comprises:

refraining the operating system from transmitting any image information to the preset boot memory during the startup.

In some embodiments, the method further comprises:

after the startup of the operating system is completed, displaying the image information on the display screen by the operating system transmitting the image information to the preset boot memory.

In some embodiments, the method further comprises:

after the startup of the operating system is completed, refreshing, by the boot program Boot and to the controller of the display screen, the image information in the preset boot memory which is transmitted from the operating system.

In some embodiments, the image information stored in the preset boot memory is raw image data which has not been encoded.

In some embodiments, the operating system is an Android system based on a Linux system.

In some embodiments, the preset boot memory is not managed by a partner system in the Linux system.

In some embodiments, after the startup of the Launcher interface is completed, the Linux system is configured to directly refresh the image information in the frame buffer Framebuffer to the controller of the display screen.

The embodiments of the present disclosure further provide a readable storage medium having stored thereon computer instructions which, when executed by a processor, implement the steps according to the embodiments shown in FIG. 1 to FIG. 5.

It may be seen that, in the present embodiment, the boot program Boot may refresh the image information stored in the preset boot memory to the controller of the display screen during the startup of the operating system by the boot program Boot, so that the electronic device may display the image information as soon as the electronic device is stared up, without waiting for the completion of the startup of the operating system, which improves the user experience with the electronic device.

It should be illustrated that the readable storage medium may be applied to an imaging device, an electronic apparatus etc., which may be selected according to a specific scenario, and is not limited here.

In the present disclosure, the terms "first" and "second" are used for descriptive purposes only and are not to be construed as indicating or implying relative importance. The term "plurality" refers to two or more, unless specifically defined otherwise.

Other implementations of the present disclosure will be readily apparent to those skilled in the art after considering the specification and taking practice of the present disclosure. The present disclosure is intended to cover any variations, uses, or adaptations of the present disclosure, which are in accordance with general principles of the present disclosure and comprise common general knowledge or conventional technical means in the art which are not disclosed in the present disclosure. The specification and embodiments are to be regarded as illustrative only, and the scope and spirit of the present disclosure are covered by the appended claims.

It is to be understood that the present disclosure is not limited to the exact structure which has been described above and is shown in the accompanying drawings, and various amendments and variations may be made without departing from the scope thereof. The scope of the present disclosure is merely defined by the appended claims.

I claim:

1. A method for booting startup of an electronic device, the electronic device comprising a boot program Boot, an operating system, a preset boot memory, and a display screen, wherein the preset boot memory is configured to store image information, the method comprising:

running the boot program Boot to start up the operating system, and during the startup of the operating system by the boot program Boot, refreshing, by the boot program Boot, the image information stored in the preset boot memory to a controller of the display screen, after the startup of the operating system is completed, displaying the image information on the display screen by the operating system transmitting the image information to the preset boot memory, after the startup of the operating system is completed, refreshing, by the boot program Boot and to the controller of the display screen, the image information in the preset boot memory which is transmitted from the operating system.

2. The method according to claim 1, wherein the image information stored in the preset boot memory comprises at least one of:
image information which is pre-stored by a user in the preset boot memory and image information transmitted from the operating system to the preset boot memory in a previous display process.

3. The method according to claim 1, wherein the boot program Boot comprises an image information refresh function, and refreshing, by the boot program Boot, the image information stored in the preset boot memory to a controller of the display screen comprises:
reading, by the image information refresh function, the image information from the preset boot memory according to a set period and refreshing the image information to the controller of the display screen.

4. The method according to claim 1, wherein the boot program Boot comprises a clock interrupt function, and the method further comprises:
switching, by the boot program Boot, a context for the refreshing of the image information and a context of the operating system according to an interrupt signal output by the clock interrupt function to switch between an operation of refreshing the image information and an operation of starting up the operating system.

5. The method according to claim 1, further comprising:
refraining the operating system from transmitting any image information to the preset boot memory during the startup.

6. The method according to claim 2, wherein the image information stored in the preset boot memory is raw image data which has not been encoded.

7. The method according to claim 1, wherein the operating system is an Android system based on a Linux system.

8. The method according to claim 7, wherein the preset boot memory is not managed by a partner system in the Linux system.

9. An electronic device, comprising a boot program Boot, an operating system, a processor, a memory, a preset boot memory, and a display screen, wherein the preset boot memory is configured to store image information, the display screen is configured to display at least the image information, the memory is configured to store the boot program Boot, and the processor is configured to read the boot program Boot from the memory, and run the boot program Boot to start up the operating system, and the boot program Boot is configured to, during the startup of the operating system by the boot program Boot, refresh the image information stored in the preset boot memory to a controller of the display screen,
wherein after the startup of the operating system is completed, the image information is displayed on the display screen by the operating system transmitting the image information to the preset boot memory,
wherein after the startup of the operating system is completed, the image information in the preset boot memory which is transmitted from the operating system is refreshed by the boot program Boot to the controller of the display screen.

10. The electronic device according to claim 9, wherein the boot program Boot comprises an image information refresh function, which is configured to read the image information from the preset boot memory according to a set period and refresh the image information to the controller of the display screen.

11. The electronic device according to claim 9, wherein the boot program Boot comprises a clock interrupt function, and the boot program Boot is configured to switch a context for the refreshing of the image information and a context of the operating system according to an interrupt signal output by the clock interrupt function to switch between an operation of refreshing the image information and an operation of starting up the operating system.

12. The electronic device according to claim 9, wherein the operating system is refrained from transmitting any image information to the preset boot memory during the startup.

13. The electronic device according to claim 9, wherein the image information stored in the preset boot memory is raw image data which has not been encoded.

14. The electronic device according to claim 9, wherein the operating system is an Android system based on a Linux system.

15. The electronic device according to claim 9, wherein the preset boot memory is not managed by a partner system in the Linux system.

16. A readable storage medium having stored thereon computer instructions which, when executed by a processor, implement the steps of the method according to claim 1.

* * * * *